Nov. 22, 1932.  D. J. STRICKLAND  1,888,398
BRICK MOLDING
Filed May 25, 1929    3 Sheets-Sheet 3

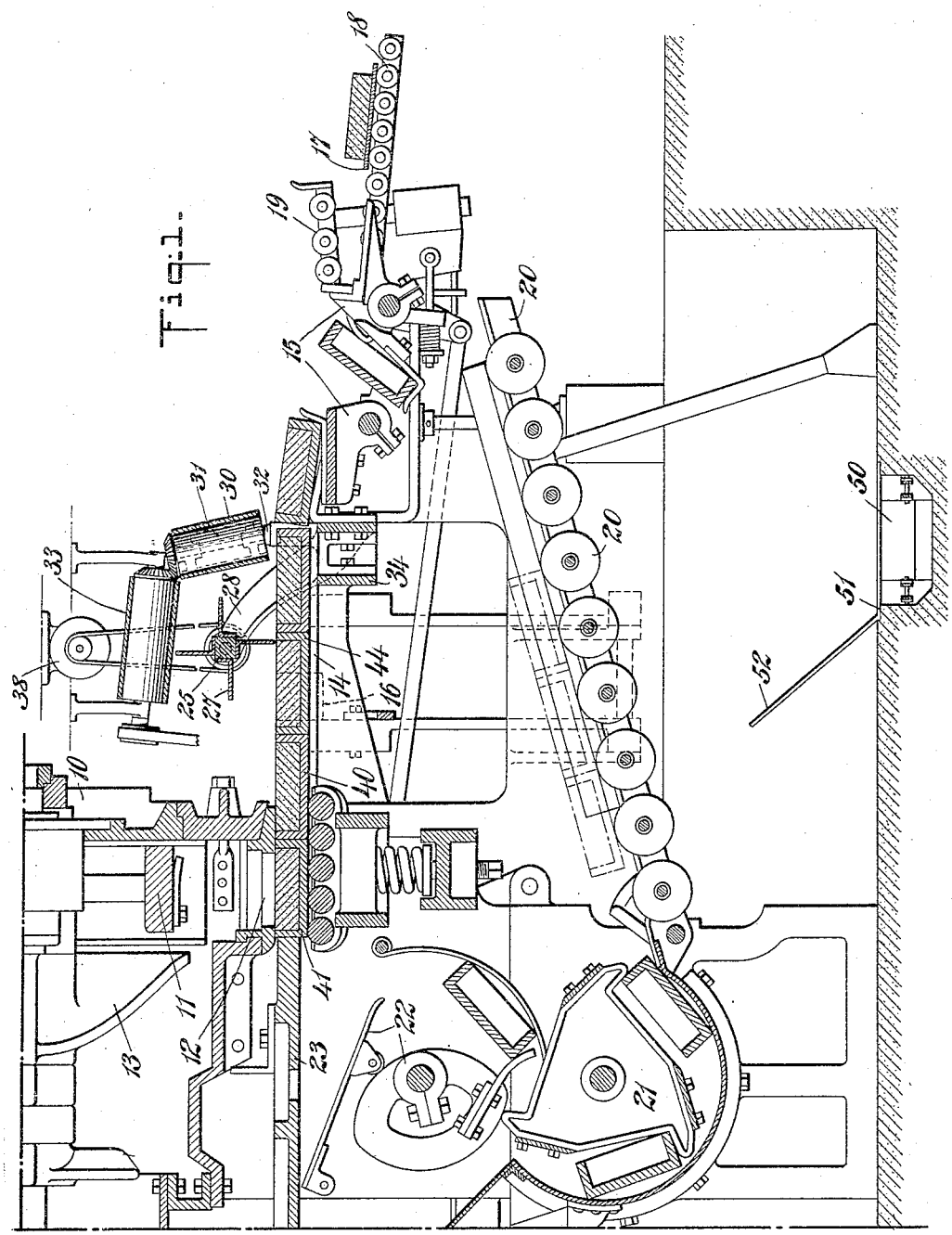

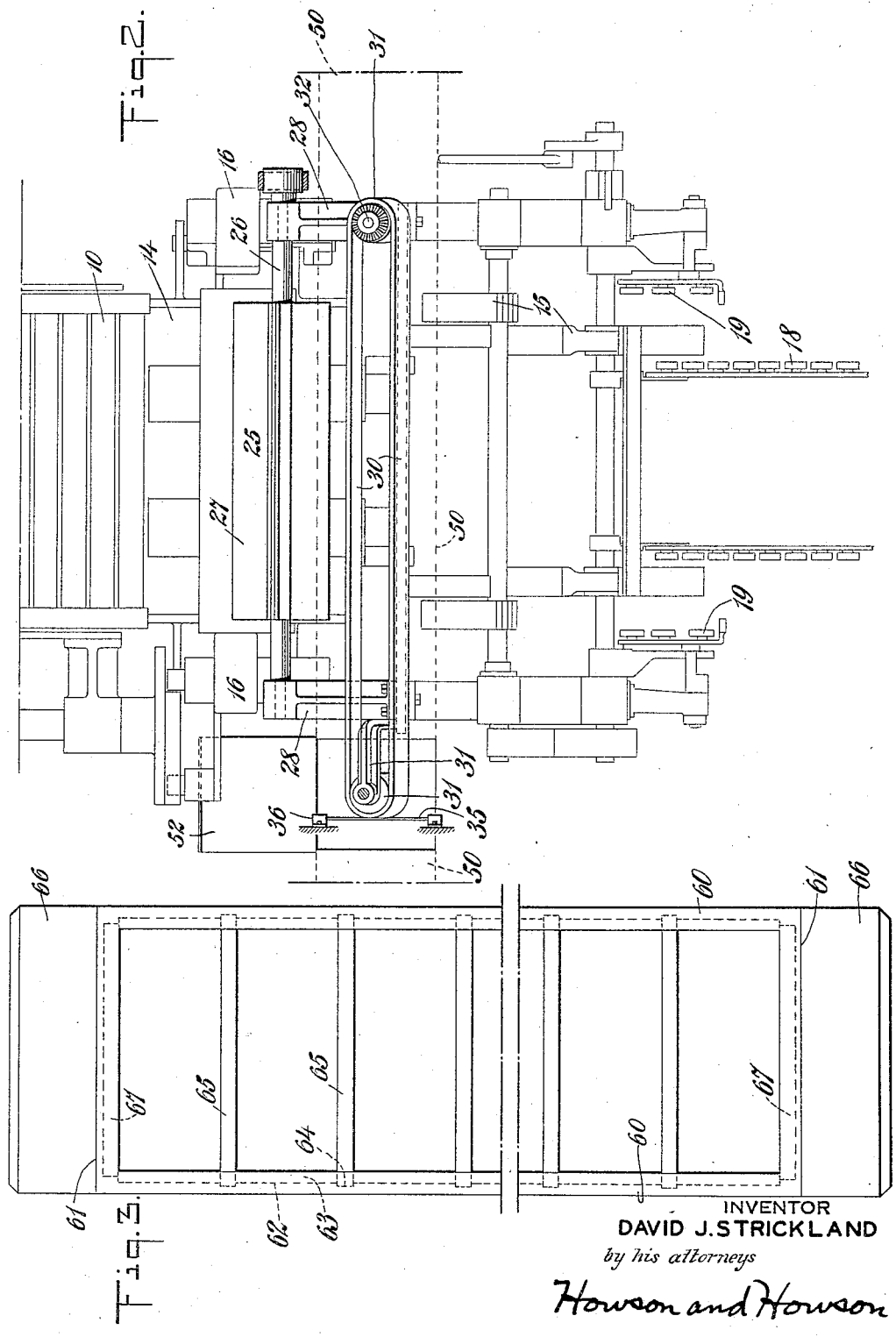

INVENTOR
DAVID J. STRICKLAND
by his attorneys
Howson and Howson

Patented Nov. 22, 1932

1,888,398

UNITED STATES PATENT OFFICE

DAVID J. STRICKLAND, OF BEACON, NEW YORK, ASSIGNOR TO HENRY POWELL RAMSDELL, TRUSTEE, OF NEWBURGH, NEW YORK

BRICK MOLDING

Application filed May 25, 1929. Serial No. 365,916.

In automatic brick molding machines of a commonly used type, the molds are delivered in succession from beneath the expressing die, past a bumping mechanism and then to the device which inverts and empties the molds and returns them for re-filling. The bricks released from the molds are carried away on flat plates by a conveyor belt. The cavities in the mold are of the size and shape which it is desired to give to the bricks but it is a common experience of brick makers that a burr is produced along certain edges of the bricks and a bevel along another edge due to the fact that the plastic material crowns up in the molds. This crowning up is found to occur to a certain degree in the molding operation itself and is made greater by the bumping which, in freeing the plastic material from the walls of the mold, causes it to crown.

The present invention has to do with a solution of this problem and its aim is to eliminate the crown of the plastic material in the molds by removing the material forming it and to ensure the distribution of the material more nearly to the exact size and shape of the cavities in the mold.

A preferred form of apparatus constructed in accordance with the invention is described hereinafter and is shown in the accompanying drawings to which reference is made in the course of the description.

In the drawings:

Figure 1 is a view in elevation, with a part shown in section, of that part of an automatic brick molding machine which fills the molds, bumps them and then empties them, the apparatus added in accordance with this invention being shown as it is applied to such a machine.

Figure 2 is a top plan view of the same.

Figure 3 is top plan view of a mold suitable for use in this machine.

Figure 4:
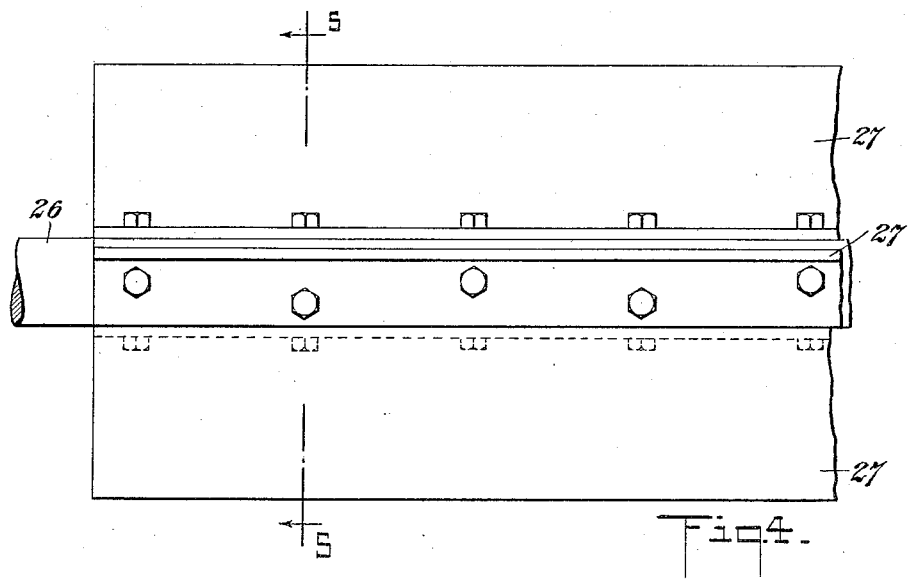
Figure 4 is plan view of the rotary cutter which forms a part of the apparatus embodying this invention.

Those familiar with brick molding machines will recognize as a well known type, the machine chosen here for an illustration of the way in which the invention is applied. Other types of machine may be used, whether vertical or horizontal, inasmuch as the invention has no dependency on features peculiar to either. The description of the machine is therefore not detailed.

The machine has a mold filling head 10 in which there is a vertically movable plunger 11 working above a die 12 under which the molds are successively positioned. The plastic material is fed into the die by an impeller 13. The molds are of a known sort having a series of cavities, each of the size and shape of the desired brick, the cavities being arranged with their long axes parallel. When each mold in its turn is filled under pressure from the plunger, the mold is moved out onto the platform 14 and, in so moving, advances the previously filled molds.

Upon each advance step by which a filled mold is moved out to the platform from beneath the plunger, another previously filled mold is delivered to the inverting mechanism 15 which, being no part of this invention, needs no description in detail. While on the platform, each mold is bumped by the alternate impacts, on its opposite ends, of a bumping mechanism 16, also known. This bumping frees the plastic material from its adhesion to the walls and so prepares it for the inverting which empties the molds by allowing the molded blocks to drop from the several cavities of each mold onto a flat plate 17.

The plate 17 is dropped onto a conveyor 18 which carries the blocks away for subsequent treatment producing the final brick. An inclined set of rollers 19 catches the inverted mold as the plate is dropped to the conveyor and causes the mold to slide back and to be inverted again as it drops down to another inclined set of rollers 20 which delivers the empty molds to a sanding device 21. The latter passes the molds up to a feeder 22 which delivers the molds, in timed relation to the movements of the plunger 11, to a pusher frame 23 reciprocating in unison with the plunger. By means of the pusher the molds are positioned beneath the expressing die 12 and as each mold is brought to this position, the mold next previously filled, as well as those on the platform, are advanced as described above.

Above the platform 14 there is a rotary cutter 25 arranged so that its axis is parallel to the platform and to the long sides of the molds as they move on the platform. The cutter (vide Figures 4 and 5) has a shaft 26 with a squared portion extending across the platform. To each side of this portion, an angle piece forming a blade 27 is secured by bolts so as to be replaceable at will. The relation between the height of the shaft and the length of the blades is such that the tips of the latter just clear the top of a mold passing beneath the cutter. The shaft is approximately in line with the forward margin of the mold being bumped when the molds are at rest and it is supported in that position by brackets 28 reaching from the main frame and having bearings in their upper ends.

Beyond the cutter is a conveyor belt 30 turning about rotors 31, which are supported at an angle to the platform by posts 32 extending from the main frame 34. Above the cutter is another belt 33 similarly supported. The driving spindles of these belts are connected by mitre gears. These belts extend across the platform and sufficiently far beyond at one side to clear the machine. At this end a wire 35 is supported between posts 36 so as to lie parallel to the face of each belt and close to it as it passes over the roller. The cutter and the belts are driven by a motor 38 through any suitable belt or gear connections to give properly related speeds. The upper belt 33 is not shown in Figure 2.

Figure 5:
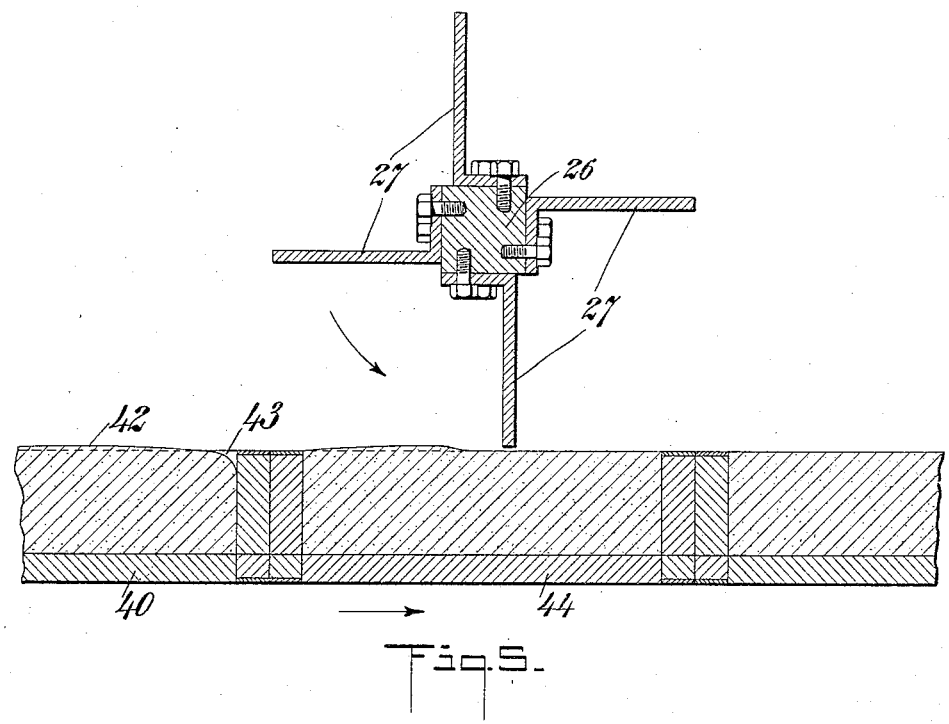
Figure 5 is a vertical sectional view through the said cutter showing its relation to the molds as they are advanced from beneath the expressing die.

The action of the cutter and of the belt will be understood best by considering Figures 1 and 5. The cutter rotates in a direction that is counter clockwise as viewed in Figure 5 and, in any event, is such that the blades approach the mold in the direction in which the molds are advanced. The mold 40 (Figure 5) is shown as it is being moved from its position one mold length in advance of the die, being pushed by the mold 41 just filled. The molds as shown in Figure 5 are therefore in advance of the position of rest illustrated in Figure 1.

As set forth above, the plastic material is crowned up (as at 42) slightly above the rim of the mold when the mold comes from the filling head. Added to this as a disturbance of the shape of the block is the effect of the advance of the mold, which, being sudden, causes the material to shift backward in the mold cavities and form the beveled forward edge 43. After the bumping operation, the material has an even greater crown as in the case of the mold 44. If the blocks are left in this shape, a burr is formed on the edges when the crown is flattened during the subsequent operations.

As the mold 44 is moved, the cutter, rotating at a speed of the order of 2000 revolutions per minute, begins its action at the forward margin of the mold 44. The blades cut into the material above the mold rim and pick it off, throwing it forward tangentially against the moving belts 30, 33. Some of the material is carried around part way by the blades and thus the top belt 33 is necessary, particularly when the rotor is turned relatively fast. The material adheres firmly to the belts and is carried to the ends which lie clear of the machine where it is removed by the cutting action of the wire 35. It is then free to drop to the endless conveyor 50 which travels across below the floor 51 and may deliver back to the filling head or to any desired place. The floor is open beneath the wire 35 to permit the plastic to drop directly onto the conveyor. A hopper or guideway 52 is provided to direct onto the conveyor any material which does not drop directly to it.

Considering further the action of the cutter on the crowned up material in the mold 44, it will be seen that not only is the material above the rim mold removed but at least some of the material in the upper part of the mass in each cavity is shifted forward due to the drag of the layer being removed in successive bits. This drag is cumulative since the cutter acts on successive parts of the mass as the mold advances, and as a result the space created by the bevel at the forward end is filled by the plastic thus shifted. An even distribution of the material within the mold cavity and a closer conformation to the size and shape of the mold, without marginal burrs or bevels, is thereby effected.

While the effectiveness of this invention does not depend on the particular type of mold used, the mold shown in Figure 3 is preferable in that it requires less frequent replacement. Its essential feature is that it is mainly of steel but has wood inserts and partitions to line the walls of the mold cavities. The steel part consists of the side members 60 and the end members 61 which the bumpers strike or, if desired, wood blocks 66 may be used at the ends of the steel frame to receive the impact of the bumper. These members 60, 61 may be integral, if so desired, as when the whole mold frame is made by casting. The plates of wood forming the bottoms of the cavities may be secured in the same way as in wood molds of known construction, and preferably are held by steel strips extending the length of the mold. Steel strips may also be used to overlie the side members to hold the inserts and partitions in place.

The inner walls of the side members 60 have faces 62 to receive wood inserts 63 which form the end walls of the cavities and recesses 64 shaped to receive the ends of the wood partitions 65 which separate the cavities. The inner walls of the end members 61 are shaped to hold wood inserts 67 of the same size as the partitions to complete the wood lining for the end cavities. If the end members are of steel, they need not be solid as the necessary strength can be obtained by hollow members suitably shaped. The advantage of this steel frame construction is that the wood parts which must be renewed frequently are small and are easily made. The greater part of the mold is of steel and for that reason it is able to withstand for a longer time the destructive bumping operation. The costly frequent replacement of the whole mold is therefore avoided.

I claim:—

1. In a molding machine having a mold filling mechanism, full-mold advancing means and a rapidly rotating cutter adapted to remove, in the direction of motion of the mold, plastic material extending above the rim of the mold and discharge said material centrifugally.

2. In a molding machine having a mold filling mechanism, full-mold advancing means and a rapidly rotating cutter adapted to remove plastic material extending above the rim of the mold, in combination with a moving belt positioned to receive said material as it is thrown from the cutter.

3. In a molding machine, a mold filling device, means for advancing the filled mold and means for shifting material within the mold toward its forward wall while removing plastic material extending above the rim of the mold.

4. In a molding machine, a mold filling device, a rotary cutter and means for effecting relative movement between the mold and said cutter as the latter rotates, said cutter acting on the plastic material extending above the rim of said mold to remove the same in successive bits in the direction of motion of the mold.

5. In a molding machine, a mold filling device, a rapidly rotating cutter and means for effecting relative movement between the mold and said cutter as the latter rotates, whereby said cutter acts on the plastic material extending above the rim of said mold to remove the same in successive bits, together with a belt and means for moving it past said cutter to receive the plastic material as it is discharged centrifugally therefrom.

6. In a molding machine, a mold filling device, a rapidly rotating cutter and means for effecting relative movement between the mold and said cutter as the latter rotates, whereby said cutter acts on the plastic material extending above the rim of said mold to remove the same in successive bits, together with a belt positioned to present a face to said material as it is discharged centrifugally from said cutter, and means for driving said belt.

7. In the art of brick molding by the method which includes the filling of a mold followed by an advancing of the mold and a bumping operation preparatory for emptying of the mold, the step of removing, after the bumping operation, the plastic material extending above the rim of the mold by moving a cutting element through the said material in the direction in which the mold is advanced whereby to shift material within the mold toward its forward wall to compensate for the rearward shifting caused by the advancing of the mold.

8. In the art of brick molding by the method which includes the filling of a mold followed by an advancing of the mold for a bumping operation preparatory for emptying of the mold, the step of removing the plastic material extending above the rim of the mold and simultaneously shifting material within the mold toward its forward wall to compensate for the rearward shifting caused by the advancing of the mold.

In testimony whereof I have signed my name to this specification.

DAVID J. STRICKLAND.